United States Patent [19]

Nash

[11] 4,175,385
[45] Nov. 27, 1979

[54] THRUST REVERSER FOR AN ASYMMETRIC AIRCRAFT EXHAUST NOZZLE

[75] Inventor: Dudley O. Nash, Forest Park, Ohio

[73] Assignee: General Electric Company, Cincinnati, Ohio

[21] Appl. No.: 859,515

[22] Filed: Dec. 12, 1977

[51] Int. Cl.² .......................... F02K 1/20; F02K 1/24
[52] U.S. Cl. ....................................... 60/230; 60/232; 239/265.27; 239/265.37; 244/12.5
[58] Field of Search ............................... 60/230, 232; 239/265.19, 265.25, 265.27, 265.37; 244/12.5

[56] References Cited

U.S. PATENT DOCUMENTS

| | | | |
|---|---|---|---|
| 2,715,312 | 8/1955 | Brame | 239/265.19 |
| 3,570,247 | 3/1971 | Denning et al. | 60/230 |
| 3,936,017 | 2/1976 | Blythe et al. | 239/265.37 |
| 4,000,610 | 1/1977 | Nash et al. | 60/230 |
| 4,000,854 | 1/1977 | Konarski et al. | 60/230 |

FOREIGN PATENT DOCUMENTS

| | | | |
|---|---|---|---|
| 646039 | 9/1962 | Italy | 239/265.19 |
| 1327385 | 8/1973 | United Kingdom | 239/265.19 |

*Primary Examiner*—Carlton R. Croyle
*Assistant Examiner*—Thomas I. Ross
*Attorney, Agent, or Firm*—Robert C. Lampe, Jr.; Donald W. Walk; Derek P. Lawrence

[57] ABSTRACT

A thrust reverser is provided for use with an asymmetric aircraft gas turbine engine exhaust nozzle. The thrust reverser includes a movable aerodynamic flap downstream of the asymmetric nozzle casing which is rotatable about one pivot in order to effect in-flight thrust vectoring through deflection of the exhaust stream, and which is also independently rotatable about another pivot to effect thrust reversing. In the reverse thrust mode, the leading edge of the flap is immersed into the exhaust stream, thereby splitting the stream into two portions, one of which is deflected upward and forward by a turning vane incorporated into the leading edge of the flap, and the other portion of which is deflected downward and forward by a hinged lip connected to the flap trailing edge. The thrust reverser thus permits the exhaust stream to be ejected in the vertical plane to produce reverse thrust without an accompanying pitch moment even though the exhaust nozzle is not symmetrical in the vertical plane.

10 Claims, 3 Drawing Figures

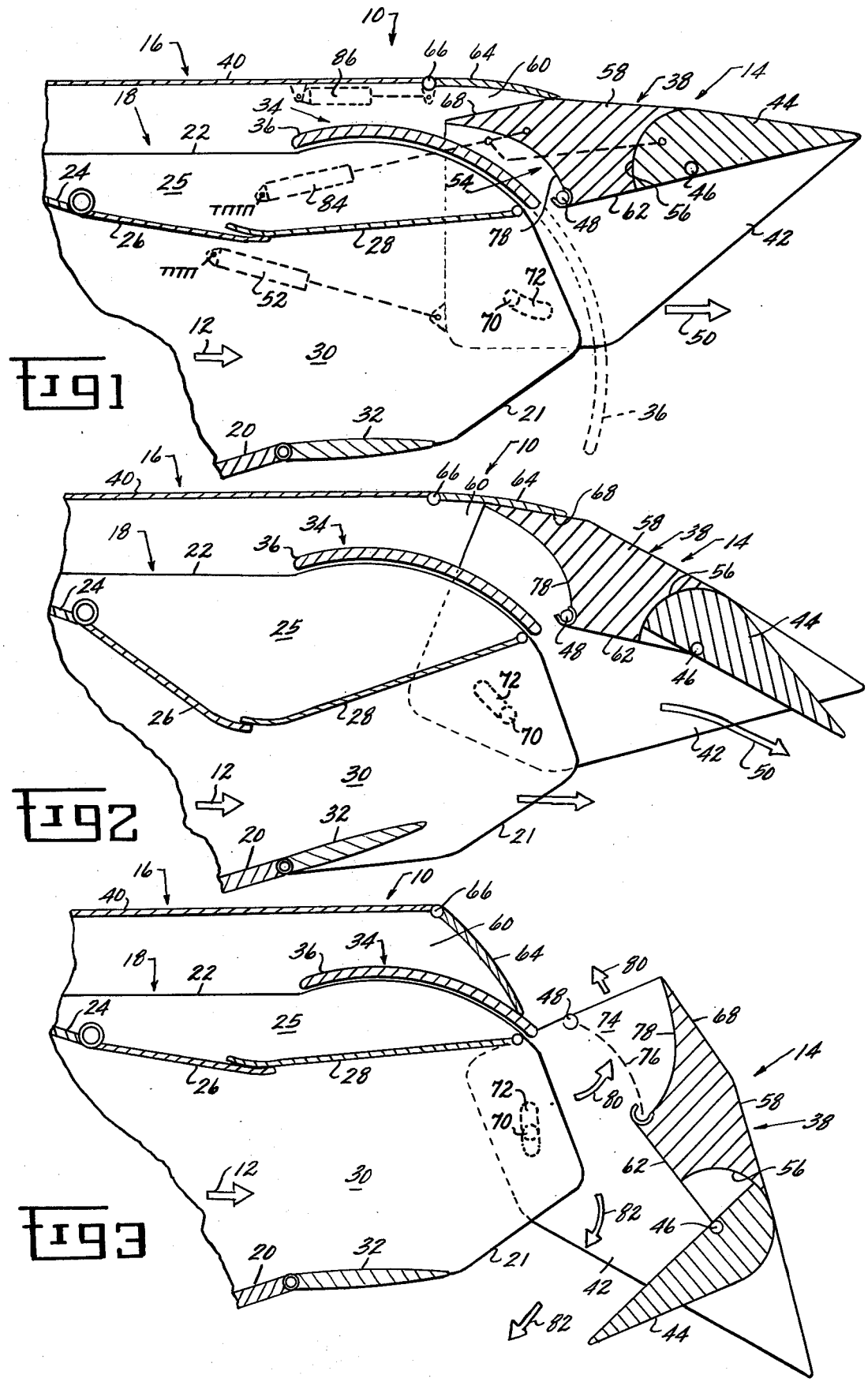

THRUST REVERSER FOR AN ASYMMETRIC AIRCRAFT EXHAUST NOZZLE

The invention herein described was made in the course of or under a contract or subcontract thereunder (or grant) with the Department of the Navy.

BACKGROUND OF THE INVENTION

The present invention applies to gas turbine engines and, more particularly, to a thrust reverser for use with an asymmetric aircraft gas turbine engine exhaust nozzle. The invention is particularly adaptable to twin engine, high performance combat aircraft which are provided with such asymmetric exhaust nozzles.

It is important in modern, high performance fighter aircraft that means be provided for suddenly arresting or decreasing the flight speed in order to enhance maneuvering capability under combat conditions. It is also important that such combat aircraft be provided with means for reducing the length of the aircraft landing roll in order to permit landing on short runways. Even commercial aircraft requires some means for augmenting conventional braking in order to arrest the speed of the aircraft after landing.

The traditional and most efficient means for accomplishing these functions has been, and will continue to be, a thrust reverser attached to or incorporated within the gas turbine engine exhaust nozzle. Such reversers have applicability only to engines of the gas turbine variety (commonly referred to as "jet engines") since recirpocating engines may more readily be provided with variable pitch propellers which can effect thrust reversal through rotation of each propeller blade about its longitudinal axis. While much progress is being made in adapting variable pitch mechanisms to gas turbine engines of the high bypass variety, of which U.S. Pat. No. 3,994,128, entitled "Dual Output Variable Pitch Turbofan Actuation System," Griswold et al, is an excellent proven example, conventional thrust reversers will continue to be the means for reversing thrust in gas turbine engines of the turbojet or low bypass ratio turbofan type characteristic of modern high performance fighter aircraft. These devices, when deployed, redirect the exhaust gas in the forward direction, thus reversing the thrust vector.

However, a new family of gas turbine exhaust nozzles is emerging which offers improved installed performance characteristics over the former exhaust nozzles which are characterized as being axisymmetric. Traditionally, these nozzles are cylindrical, frustoconical, or a combination of the two geometries which produces a nozzle which is symmetric about a central longitudinal axis. The new family of nozzles, typified by the proven augmented deflecting exhaust nozzle of U.S. Pat. No. 4,000,610, entitled "Flight Maneuverable Nozzle for Gas Turbine Engines," Nash et al, and assigned to the assignee of the present invention, is characterized as being asymmetric as a result of careful attention being paid to the integrated effects of engine and airframe performance, and also as a result of a recognition of the necessity for enhancing aircraft maneuverability through in-flight exhaust vectoring. The augmented deflecting exhaust nozzle (ADEN) of U.S. Pat. No. 4,000,610, being primarily adapted to high performance combat aircraft, will also strongly benefit through the provision of a reverse thrust capability. The ADEN, however, being an asymmetric exhaust nozzle, is difficult to fit with a conventional thrust reverser, particularly in a twin engine, side-by-side installation. The reverse exhaust flow from each engine must, in twin engine installations, be ejected in the vertical plane due to the presence of the laterally adjacent engine, and the ADEN is not symmetrical in the vertical plane. Furthermore, prior art thrust reversers have been designed for use with traditional axisymmetric nozzles with little attention being given to their integration into an in-flight maneuvering enhancement nozzle.

The problem is that in order to produce reverse thrust without an accompanying pitch movement, which could create aircraft instability, it is necessary that the reversed exhaust stream be split into two streams, one of which is deflected upward and forward by more than 90° and the other of which is deflected downward and forward by more than 90°, with the unavoidable transverse components of thrust being equal and opposite to cancel any adverse effect on aircraft attitude control. In other words, the reverse exhaust flow must be arranged so that only pure reverse thrust is created without extraneous transverse force components or pitching moments. The present invention provides a means for effectively reversing the thrust in asymmetric nozzles such as the in-flight maneuvering ADEN without degradation to its clearly superior installed performance characteristics. In fact, incorporation of the subject invention into the ADEN will even further enhance the in-flight maneuvering capability of any aircraft in which it is installed.

SUMMARY OF THE INVENTION

Accordingly, it is the primary object of the present invention to provide a thrust reverser for an asymmetric gas turbine engine exhaust nozzle for high performance fighter aircraft.

It is a further object of the present invention to provide such a thrust reverser without degrading the superior installed performance characteristics of certain asymmetric exhaust nozzles.

These and other objects and advantages will be more clearly understood from the following detailed description, drawings and specific examples, all of which are intended to be typical of rather than in any way limiting to the scope of the present invention.

Briefly stated, the above objectives are provided by incorporation of a movable aerodynamically contoured flap downstream of the asymmetric nozzle casing. The flap is rotatable about two pivots, one of which permits the flap to deflect the exhaust stream in the usual manner of the prior art augmented deflector exhaust nozzle and the other of which positions the flap such that the flap leading edge is immersed into the exhaust stream to split the stream into two portions. A turning vane formed at the flap leading edge deflects a portion of the exhaust stream upward and forward through a gap created between the flap and casing as a result of rotation about the pivot, whereas the remainder of the exhaust stream is deflected downward and forward by the flap and a hinged lip on the trailing edge of the flap. The turning vane, gap, flap and lip are sized such that the transverse thrust components are equal and opposite to eliminate undesirable pitching moments.

DESCRIPION OF THE DRAWINGS

While the specification concludes with claims particularly pointing out and distinctly claiming the subject matter which is regarded as part of the present invention, it is believed that the invention will be more fully understood from the following description of the preferred embodiments which is given by way of example with the accompanying drawings in which:

FIG. 1 is a cross-sectional schematic view of an asymmetric gas turbine engine exhaust nozzle incorporating the thrust reverser of the present invention and in which the nozzle is operating in the conventional forward flight mode;

FIG. 2 is a view similar to FIG. 1 in which the asymmetric exhaust nozzle is shown operating in the thrust vectoring mode; and FIG. 3 is a view similar to FIGS. 1 and 2 in which the thrust reverser has been deployed for reversed thrust operation.

DESCRIPTION OF THE PREFERRED EMBODIMENT

Referring to the drawings wherein like numerals correspond to like elements throughout, attention is first directed to FIG. 1 wherein an asymmetric gas turbine engine exhaust nozzle, depicted generally at 10 and embodying the present invention, is diagrammatically shown. Hot gases of combustion are expanded through a turbine (not shown) in the known manner and enter the exhaust nozzle from the left of FIG. 1 as depicted by arrow 12. The asymmetric exhaust nozzle 10 is substantially the same as the augmented deflector exhaust nozzle (ADEN) described in greater particularity in U.S. Pat. No. 4,000,610, the subject matter of which is incorporated herein by reference, with the addition of a thrust reverser depicted generally at 14.

Briefly, the nozzle includes an asymmetric casing 16 having two substantially opposed walls 18 and 20. Two generally perpendicular side walls 21, only one of which is shown, connect walls 18 and 20 to produce a generally rectangular cross section. Wall 18 comprises an outer structural casing 22 and a spacially separated liner 24, only a portion of which is shown, forming therebetween a cooling air passage 25. It is recognized that high temperature exhaust nozzles require sophisticated cooling techniques in order to avoid exceeding the critical metal melting temperature, and a more complete description of such a cooling system for the ADEN may be found in U.S. Pat. No. 4,000,612, entitled "Cooling System For A Thrust Vectoring Gas Turbine Engine Exhaust System," Wakeman et al, which is assigned to the assignee of the present invention. Suffice it to say that passage 25 is a source of coolant for this nozzle. Downstream of liner 24 are a pair of convergent-divergent flaps, 26 and 28, respectively, which function to modulate the area of an exhaust stream flow path 30 defined by the exhaust casing 16. A variable area ventral flap 32 which forms the downstream extremity of wall 20 cooperates with convergent-divergent flaps 26, 28 to further control the area of the exhaust stream flow path 30 and provides exhaust stream expansion control. For V/STOL operation, a rotating bonnet-type deflector 34 is used to deflect the exhaust stream downward. As is more fully explained in U.S. Pat. No. 4,000,610, deflector 34 possesses a substantially U-shaped cross-sectional profile having an arcuate deflector bonnet 36. During cruise operation, deflector 34 is stowed as shown so as not to compromise the aerodynamically smooth contours of flow path 30. In order to provide an aircraft with a vertical takeoff capability, the deflector 34 may be deployed as shown in phantom to deflect the exhaust stream in the downward direction. The operation of these components is described in greater particularity in U.S. Pat. No. 4,000,610 and a system of actuation is provided in U.S. Pat. No. 3,979,067, entitled "Actuating Means For A Thrust Vectoring Gas Turbine Engine Exhaust Nozzle," Nash, which is assigned to the assignee of the present invention and the subject matter of which is incorporated herein by reference.

The ADEN is also provided with a variable external expansion ramp or variable position, aerodynamically contoured flap downstream of asymmetric casing 16, a modified version of which is designated 38. Preferably, flap 38 comprises the trailing edge portion of a wing or other aircraft control surface, represented by surface 40. As used herein, surface 40 shall comprise a portion of the exhaust nozzle and is meant to include any stream-lined surface exposed to a flow of atmospheric air. Flap 38 provides flight maneuver vectoring as well as exhaust stream expansion control and in the present invention comprises an integral portion of the thrust reverser 14. The flap is generally straight in the horizontal plane and is provided with a pair of generally vertical side walls at its ends, only one of the side walls being shown at 42 for simplicity. These side walls function to prevent sideward spillage of the exhaust flow during reverse thrust as will soon become apparent.

Flap 38 is provided with a leading edge 54, a trailing edge 56, an upper surface 58 separated from the casing outer surface 40 by a space 60 and a lower surface 62 forming a generally collinear extension of an upper portion of the exhaust stream flow path 30. A movable door 64 connected to the casing at 66 covers space 60 during normal cruise operation (FIG. 1) and thrust vectoring operation (FIG. 2) and travels along an inclined portion 68 of the flap upper surface to provide a streamlined contour for external atmospheric flow.

The trailing edge 56 of flap 38 is provided with a movable contoured lip 44 which is hinged for rotation about axis 46 associated with the flap or side walls 42. Flap 38, in turn, is rotatable about a fixed pivot 48 to produce, in cooperation with lip 44, a change in the direction of the exhaust flow exiting the nozzle as represented by arrow 50. This is characteristic of the in-flight thrust vectoring mode of operation represented by FIG. 2 in which both flap 38 and lip 44 have been repositioned to alter the direction of flow arrow 50, thereby revectoring nozzle thrust to produce a vertical thrust component for enhanced aircraft maneuverability. Means, in the form of a hydraulic or pneumatic flap actuator 52 connected to each side wall 42, are provided for rotating flap 38 about pivot 48. Similar actuation means may be provided for rotation of lip 44 about axis 46.

A remote pivot 70 is provided on side walls 21 as shown in FIG. 1. The pivot engages a curved slot 72 in flap side walls 42, the length of the slot limiting the degree of rotation of flap 38 about pivot 48. The two extremes of flap rotation are depicted in FIGS. 1 and 2. Referring now to FIG. 3, it will be appreciated that rotation of flap 38 about pivot 70 causes a gap 74 to open between flap 38 and casing 16 and, in particular, between the leading edge of flap 38 (which is immersed in the exhaust stream) and divergent flap 28. In such a mode, flap 38 is disengaged from pivot 48 and the flap leading edge describes an arc 76 intercepting the exhaust stream and splitting the flow into two portions. Pivot 48 is located along this arc.

Turning means comprising, for example, a generally concave arcuate turning vane 78 connecting the flap upper and lower surfaces 58, 62, respectively, at the vane leading edge 54, turns a first portion of the exhaust flow represented by arrows 80 upward and forward through an angle greater than 90° and through gap 74. Door 64 uncovers space 60 and provides a streamlined passage for the exhaust flow. The remaining portion of the exhaust flow as represented by arrows 82 is deflected downward by the lower flap surface 62 and is then deflected downward and forward by hinged lip 44 which may be positioned substantially perpendicular to flap 38 as illustrated.

The two deflected flow portions each contribute a thrust vector component in the reverse direction to accomplish the objective aircraft deceleration. Additionally, each flow portion produces a transverse thrust component, in opposite directions, in the vertical plane. However, it is clear that through proper sizing of the component portions of the described thrust reverser, the transverse thrust components can be balanced (i.e., made equal and opposite) so as to preclude a net thrust component in the vertical direction which could produce adverse pitching moments. Thus, the configuration of the present invention provides a convenient and efficient means for producing symmetric thrust reversal in an asymmetric nozzle. Furthermore, the streamlined thrust reverser not only ensures retention of the installed performance benefits of the asymmetric nozzle, but even enhances flight maneuvering capability through the added capabilities of rapid deceleration and improved thrust vectoring through partial deployment of hinged lip 44 as shown in FIG. 2 when compared with the corresponding nozzle and flap of U.S. Pat. No. 4,000,610.

Separate means for rotating flap 38 about pivot 70 may be provided as, for example, a pair of hydraulic or pneumatic reverser actuators 84 connected to each end of the flap, only one reverser actuator being shown herein for clarity. Furthermore, it is within the skill of one familiar with this art to interconnect the lip 44 with reverser actuator 84 by means of a system of cams, levers and/or links. An actuator 86 of a known variety can be used to position door 64 as required.

Flap 38 thus rotates about two pivots, 48 and 70, and has two sets of actuators, one for flight maneuver vectoring and one for reverse thrust operation. During the flight maneuver mode, flap actuators modulate the flap angle and the thrust reverser actuators 84 exert a steady load at pivot 48, keeping the flap engaged therewith. During reverse thrust operation, the reverser actuators 84 modulate the flap position while the flap actuators 52 exert a steady load at pivot 70, keeping the flap securely engaged therewith. Thus, the control systems are mutually independent, reliable and simple.

It will be obvious to one skilled in the art that certain changes can be made to the above-described invention without departing from the broad inventive concept of producing balanced, symmetrical reversed thrust in a basically nonsymmetrical exhaust nozzle. For example, actual component shapes and relative sizes may vary from nozzle to nozzle in order to properly balance the reverse thrust loads. Additionally, numerous arrangements for actuating flap 38, lip 44 and door 64 are possible and the examples given herein are not intended to be limiting. Furthermore, the thrust reverser of the present invention is independent of the upstream nozzle configuration and is adaptable to many other configurations of flight maneuverable nozzles. In particular, while the thrust reverser of the present invention has been illustrated in connection with the ADEN nozzle, it is not intended that the application of the present invention be so limited. It is intended that the appended claims cover these and all other variations in the present invention's broad inventive concepts.

Having thus described the invention, what is claimed as novel and desired to be secured by Letters Patent of the United States is:

1. A thrust reverser for use with an asymmetric exhaust nozzle having an exhaust casing partially defining to its interior an exhaust stream flow path, said reverser comprising a flap located downstream of the casing and having a leading edge and a trailing edge, a first flap pivot, means for rotating said flap about said first pivot such that the flap leading edge describes an arc intercepting the exhaust stream so that the flap leading edge is immersed in the exhaust stream and separated from the casing by a gap, a second flap pivot located along the arc at a point fixed in relation to said exhaust casing, means for rotating said flap about the leading edge at said second pivot, means associated with the flap leading edge for turing a portion of the exhaust stream upward through an angle greater than ninety degrees and through the gap when said flap is rotated about said first pivot, and means associated with the flap trailing edge for deflecting the remainder of the exhaust stream downward through an angle greater than ninety degrees when said flap is rotated about said first pivot.

2. The thrust reverser as recited in claim 1 wherein said turning means and said deflecting means are sized to produce an upward thrust vector component and a downward thrust vector component, respectively, which are of generally equal magnitude.

3. The thrust reverser as recited in claim 1 wherein said flap has an upper surface and a lower surface and wherein said turning means comprises a generally concave arcuate turning vane connecting the flap surfaces at the leading edge.

4. The thrust reverser as recited in claim 1 wherein said deflecting means comprises a movable lip connected to the flap trailing edge.

5. The thrust reverser as recited in claim 4 wherein said lip is hinge connected to said flap.

6. The thrust reverser as recited in claim 1 wherein said flap comprises a generally straight airfoil portion and a pair of side flaps connected to and generally perpendicular to said airfoil portion to prevent sideward spillage of the exhaust stream, and wherein said side flaps are connected to said casing at said first pivot.

7. The thrust reverser as recited in claim 1 wherein said casing includes a streamlined outer surface for exposure to atmospheric flow, wherein said flap includes a streamlined upper surface for exposure to atmospheric flow and a lower surface comprising a continuation of the exhaust stream flow path, and wherein said flap upper surface is separated from said casing outer surface by a space.

8. The thrust reverser as recited in claim 7 further comprising a movable door connected to said casing and covering said space when said flap is rotated about said second pivot, and wherein said door is of such a length that said space is uncovereed to permit the passage of the upward exhaust stream portion when said flap is rotated about said first pivot.

9. A thrust reverser for an asymmetric nozzle having an exhaust casing partially defining to its interior an exhaust stream flow path and having an aerodynamically streamlined outer surface comprising:
- a flap located downstream of said casing having a leading edge, a trailing edge, an upper surface separated from the casing outer surface by a space and a lower surface generally forming a continuation of the exhaust stream flow path;
- a first pivot;
- means for rotating said flap about said first pivot so as to immerse said flap leading edge into the exhaust gas stream and to produce a gap between said casing and said flap leading edge;
- a turning vane incorporated into said flap leading edge for deflecting a portion of the exhaust stream through the gap when immersed into the exhaust stream;
- a hinged lip connected to said flap trailing edge for deflecting the remainder of the exhaust stream in a direction generally opposite to the flow direction through said casing;
- a second pivot remote from said first pivot and about which said flap is rotatable for redirecting the total exhaust stream thrust vector; and
- means for rotating said flap about said second pivot.

10. An asymmetric exhaust nozzle comprising:
- an exhaust casing partially defining in its interior an exhaust stream flow path and having an outer surface;
- a flap located downstream of said casing having a leading edge, a trailing edge, an upper surface and a lower surface wherein said lower surface defines a generally collinear extension of an upper portion of said exhaust stream flow path during undeflected exhaust nozzle operation;
- a pivot;
- means for rotating said flap about said pivot to a position wherein said flap leading edge is immersed into the exhaust gas stream and a gap is produced between said casing and said flap leading edge;
- a turning vane incorporated into said flap leading edge for deflecting a portion of the exhaust stream through said gap to produce a first thrust vector component generally normal to the exhaust casing flow; and
- a hinged lip connected to said flap trailing edge for deflecting the remainder of the exhaust stream to produce a second thrust vector component generally equal and opposite to the first thrust vector component.

* * * * *